United States Patent Office 3,417,134
Patented Dec. 17, 1968

3,417,134
UNSATURATED SULFONIC ACIDS
Heinrich Rinkler and Gunther Nischk, Dormagen, Germany, assignors to Farbenfabriken Bayer Aktiengesellschaft, Leverkusen, Germany, a corporation of Germany
No Drawing. Filed Aug. 5, 1966, Ser. No. 570,412
Claims priority, application Germany, Aug. 7, 1965, F 46,844
9 Claims. (Cl. 260—506)

ABSTRACT OF THE DISCLOSURE

Olefinically unsaturated amidomethylene-N-carboxylic acid amide sulfonic acids and salts thereof, useful in the copolymerization with styrene and divinyl benzene are prepared and have the formula R—CO—NH—CH$_2$—NH—CO—(CH$_2$)$_x$—SO$_3$Me in which R—CO— is acryl, methacryl, crotonyl or cinnamyl $x$ is an integer from 1 to 4, and Me is hydrogen or an alkali metal.

---

This invention relates to unsaturated sulfonic acids and to a process for their preparation in which unsaturated N-chlorocarboxylic acid amides are reacted with alkali metal sulfites.

This invention has as its principal object the provision of unsaturated sulfonic acids or their salts of the general formula R—CO—NH—CH$_2$—NH—CO—(CH$_2$)$_x$—SO$_3$—Me wherein R represents an olefinically unsaturated hydrocarbon radical, $x$ is an integer from 1 to 4 and Me hydrogen or an alkali metal.

It has been found that N-alkenylamidomethylene-N-carboxylic acid amide sulphonic acids or their salts can be prepared by a process in which compounds corresponding to the formula R—CO—NH—CH$_2$—NH—CO—(CH$_2$)$_x$—Z in which Z represents chlorine, bromine or iodine, $x$ is an integer from 1 to 4 and R is an alkenyl radical, are reacted in aqueous solution with alkali metal sulfites.

Examples of suitable starting components are:

N-methacrylamidomethylene-N-chloroacetamide,
N-methacrylamidomethylene-N-β-chloropropionamide,
N-crotonylamidomethylene-N-chloroacetamide,
N-cinnamylamidomethylene-N-chloroacetamide and
N-cinnamylamidomethylene-N-β-chloropropionamide.

These compounds are treated in aqueous solution with alkali metal sulphites such as sodium, potassium or lithium sulphite, at temperatures in the range from 30 to 100° C., preferably from 40 to 60° C. The ratio between organic halogen compound and sulphite may conveniently comprise equimolar quantities. It is, of course, also possible to use an excess of alkali metal sulphite although it should not exceed a maximum of 100%. Alkali metal salts of sulphonic acids which, on cooling, crystallise out practically free from halogen, are then formed, their formation being accompanied by the elimination of alkali metal halides. The N-acyl-amidomethylene-N-ω-halogen acetamides used here can be prepared by known processes, for example by condensing N-methylol-SO-halogenacyl amides, or their corresponding alkylethers, with unsaturated acid amides, such as methacrylamide, crotonic acid amide or cinnamic acid amide.

It is possible by the process according to the invention to obtain compounds corresponding to the formula R—CO—NH—CH$_2$—NH—CO—(CH$_2$)$_x$—SO$_3$Me in which R represents an olefinically unsaturated hydrocarbon radical, $x$ is an integer from 1 to 4 and Me represents hydrogen or an alkali metal.

The olefinically unsaturated hydrocarbon radical R may also be represented by the formula $$R_1-CH=C-\underset{R_2}{|}$$

in which R$_1$ represents hydrogen, alkyl or aryl and R$_2$ represents hydrogen or alkyl. R can for example represent a methacryl, crotonyl or cinnamyl radical.

It is surprising that these novel sulphonic acids are readily formed in aqueous media in good yields, because the starting materials are almost insoluble in water at the temperatures preferably used, and that there is no evidence of polymerisation to compounds of relatively high molecular weight because sulphites, as reducing agents, have a polymerisation-initiating action. In addition, it is known from the literature that, in most instances, methylene-bis-acylamides are rapidly split at elevated temperature in alkaline solution.

The novel unsaturated sulphonic acids, or their salts, prepared in accordance with the invention are suitable for copolymerisation with vinyl compounds, such as styrene and divinyl benzene, the resulting copolymers being used as ion exchangers.

The following examples illustrate more specifically the instant invention;

Example 1

93 parts by weight of chloroacetamide and 129 parts by weight of methacrylamide-N-methylol methyl ether (or 115 parts by weight of N-methylolmethacrylamide) are heated for 2 to 3 hours at 120 to 130° C. in the presence of 1 part by weight of p-toluene sulphonic acid as catalyst and 1 part by weight of phenothiazine. 28 to 32 parts by weight of methanol (or 16 to 18 parts by weight of water) are distilled off. The residue, methacrylamido-methylene-N-chloroacetamide, crystallises on cooling and can be recrystallised from ethanol. Yield=170 parts by weight, M.P.=129° C.

100 parts by weight of methacrylamidomethylene-N-chloroacetamide are heated at 50 to 60° C. in 200 parts by weight of water. 210 parts by weight of an aqueous 40% by weight potassium sulphite solution are added dropwise at this temperature over a preiod of 2 to 3 hours. After an interval of one 1 hour, any slight impurities are filtered off. When the filtrate is cooled, the product $$\underset{}{\text{KO}_3\text{SCH}_2-\text{CONH}-\text{CH}_2-\text{NH}-\text{CO}-\overset{\text{CH}_3}{\underset{|}{\text{C}}}=\text{CH}_2}$$

is deposited in crystalline form. Yield=104 parts by weight.

Example 2

107 parts by weight of β-chloropropionamide and 129 parts by weight of methacrylamide-N-methylol-methylether (or 115 parts by weight of N-methylolmethacrylamide) are heated for 2 to 3 hours at 120 to 130° C. in the presence of 1 part by weight of p-toluene sulphonic acid as the catalyst and 1 part by weight of phenothiazine. 28 to 32 parts by weight of methanol (or 16 to 18 parts by weight of water) are distilled off. The residue, methacrylamidomethylene-β-chloropropionamide, crystallises on cooling and can be recrystallised from ethanol. Yield= 185 parts by weight, M.P. 134° C.

100 parts by weight of methacrylamidomethylene-N-β-chloropropionamide are heated at 50 to 60° C. in 200 parts by weight of water. 200 parts by weight of an aqueous 40% by weight potassium sulphite solution are added dropwise over a period of 2 to 3 hours this temperature. After an interval of 1 hour, any slight impurities are filtered off. When the filtrate is cooled, the product

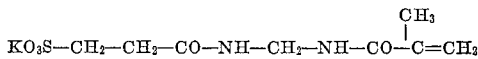

precipitates in crystalline form. Yield=106 parts by weight.

Example 3

123 parts by weight of N-methylol chloroacetamide and 85 parts by weight of crotonic acid amide are heated for 2 to 3 hours at 120 to 130° C. in the presence of 2 parts by weight of p-toluene sulphonic acid and 1 part by weight of phenothiazine. 16 to 18 parts by weight of water are then distilled off. The residue, crotonylamidomethylene-N-chloroacetamide, can be recrystallised from ethanol Yield =160 parts by weight, M.P. 141° C.

100 parts by weight of crotonylamidomethylene-chloroacetamide are heated at 60° C. in 300 parts by weight of water. 210 parts by weight of an aqueous 40% by weight potassium sulphite solution are added dropwise at this temperature over a period of 4 hours. After an interval of 1 to 2 hours, any slight impurities are filtered off. When the filtrate is cooled, the product,

KO$_3$S—CH$_2$—CO—NH—CH$_2$—NH—
CO—CH=CH—CH$_3$ precipitates in crystalline form. Yield=106 parts by weight.

Example 4

123 parts by weight of N-methylolchloroacetamide and 147 parts by weight of cinnamic acid amide are heated for three hours at 120 to 130° C. in the presence of 2 parts by weight of p-toluene sulphonic acid and 1 part by weight of phenothiazine. 16 to 18 parts by weight of water are distilled off. The residue, cinnamylamidomethylene-N-chloroacetamide, can be recrystallised from ethanol. Yield=214 parts by weight M.P. 178° C.

100 parts by weight of cinnamylamidomethylene-N-chloroacetamide are heated by 70° C. in 400 parts by weight of water. 106 parts by weight of an aqueous 40% by weight potassium sulphite solution are added dropwise at this temperature over a period of 4 hours. After an interval of 2 hours, any slight impurities are filtered off. When the filtrate is cooled, the product

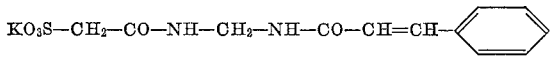

is precipitated in crystalline form. Yield=93 parts by weight.

What we claim is:

1. The olefinically unsaturated amidomethylene-N-carboxylic acid amide sulfonic acid compound having the formula R—CO—NH—CH$_2$—NH—CO—(CH$_2$)$_x$—SO$_3$Me in which R—CO— is acryl, methacryl, crotonyl of cinnamyl, $x$ is an integer from 1 to 4, and Me is hydrogen or an alkali metal.

2. The olefinically unsaturated amidomethylene-N-carboxylic acid amide sulfonic acid compound of claim 1 having the formula

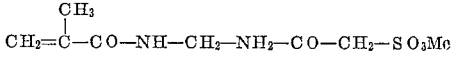

3. The olefinically unsaturated amidomethylene-N-carboxylic acid amide sulfonic acid compound of claim 1 having the formula CH$_3$—CH=CH—CO—NH—CH$_2$—
NH—CO—CH$_2$—SO$_3$Me 4. The olefinically unsaturated amidomethylene-N-carboxylic acid amide sulfonic acid compound of claim 1 having the formula

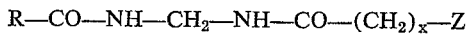

5. A process for the preparation of olefinically unsaturated amidomethylene-N-carboxylic acid amide sulfonic acid compounds, which comprises reacting a ω-halogen acetamide of the formula R—CO—NH—CH$_2$—NH—CO—(CH$_2$)$_x$—Z in which R—CO— is acryl, methacryl, crotonyl or cinnamyl, $x$ an integer from 1 to 4 and Z is chlorine, bromine or iodine, with an alkali metal sulfite, said reaction being carried out in an aqueous medium at temperatures in the range from +30 to 100° C.

6. The process of claim 5, wherein the reaction is effected with equimolecular quantities of the acetamide and the alkali metal sulfite.

7. The product of claim 2 wherein Me is potassium.
8. The product of claim 3 wherein Me is potassium.
9. The product of claim 4 wherein Me is potassium.

References Cited

UNITED STATES PATENTS 3,178,385  4/1965  Dinges et al. _____ 260—506

DANIEL D. HORWITZ, *Primary Examiner.*

U.S. Cl. X.R.

260—2.1, 79.3, 513, 558, 561

UNITED STATES PATENT OFFICE
CERTIFICATE OF CORRECTION

Patent No. 3,417,134                                                  December 17, 1968

Heinrich Rinkler et al.

It is certified that error appears in the above identified patent and that said Letters Patent are hereby corrected as shown below:

Column 2, line 49, "preiod" should read -- period --. Column 4, line 6, "crotonyl of" should read -- crotonyl or --; line 25, "-CO-$CH_3$-$SO_3$Me" should -- -CO-$CH_2$-$SO_3$Me --.

Signed and sealed this 24th day of March 1970.

(SEAL)
Attest:

Edward M. Fletcher, Jr.                      
Attesting Officer                               WILLIAM E. SCHUYLER, JR.
                                                                   Commissioner of Patents